May 5, 1970  H. SCHÄFER ET AL  3,509,801

SUPPORT STRUCTURE FOR ROLLER VEHICLE

Filed June 14, 1968  3 Sheets-Sheet 1

*INVENTORS*
HEINZ SCHÄFER
GERHARD HAUSKE
ERNST NIEBEL
BY
Kenneth C. Witt
ATTORNEY

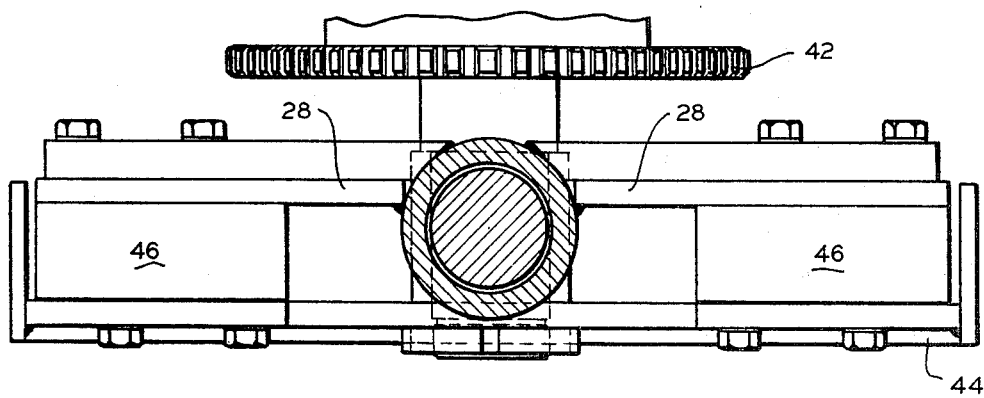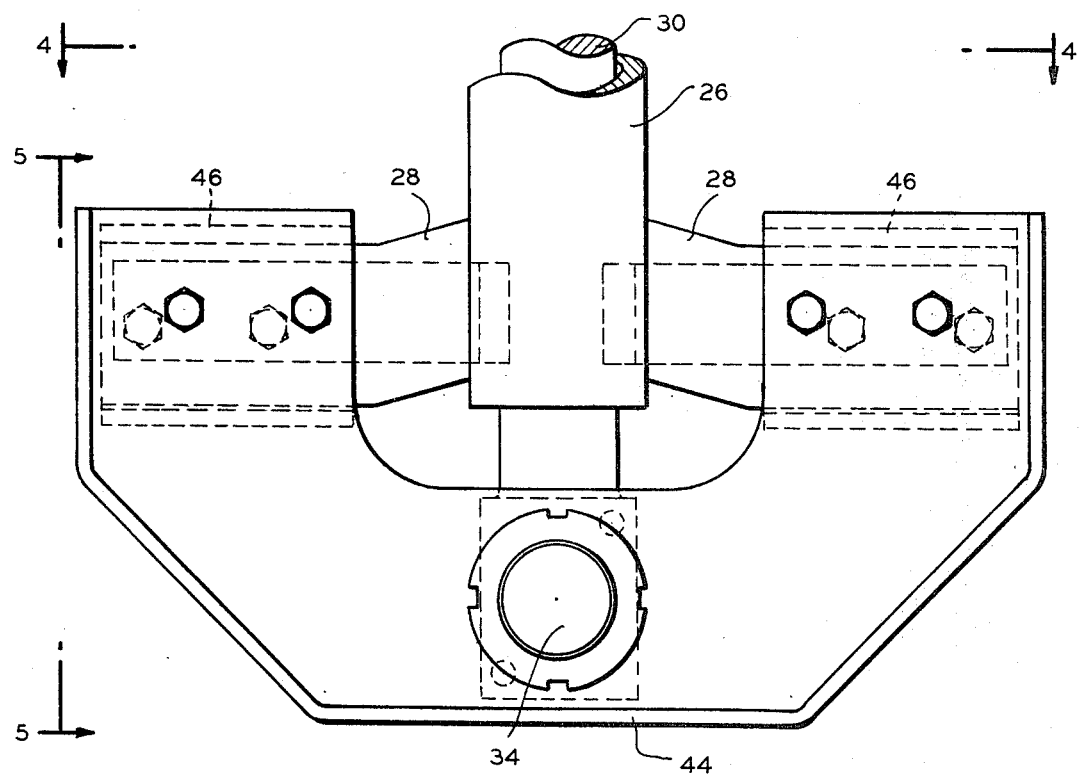

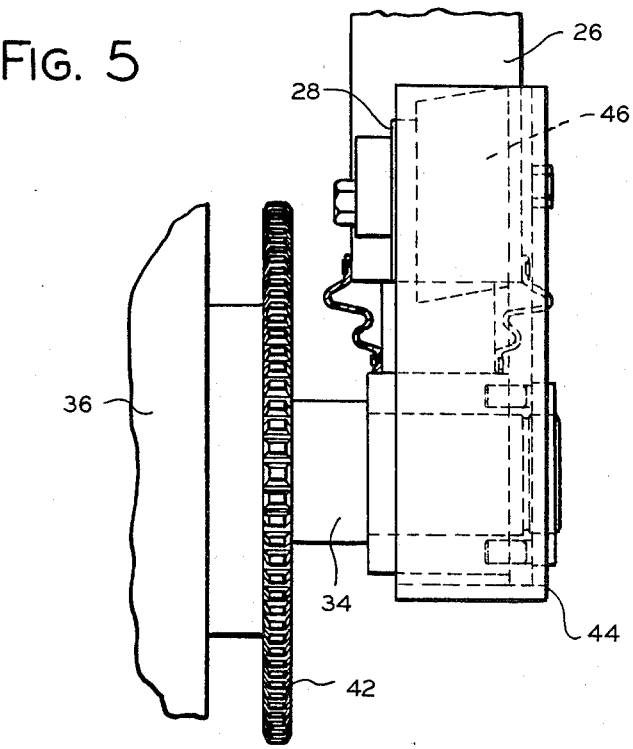
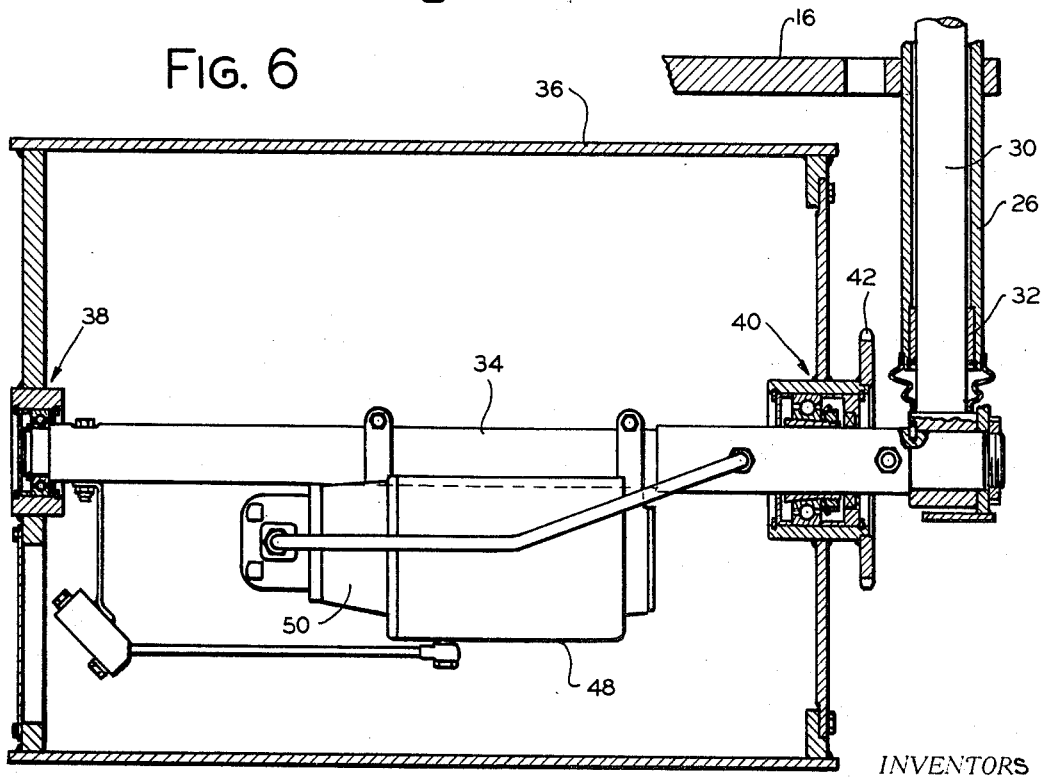

United States Patent Office 3,509,801
Patented May 5, 1970

3,509,801
SUPPORT STRUCTURE FOR ROLLER VEHICLE
Heinz Schäfer and Gerhard Hauske, Limburg, Lahn, and Ernst Niebel, Runkel, Lahn, Germany, assignors to Clark Equipment Company, a corporation of Michigan
Filed June 14, 1968, Ser. No. 737,045
Int. Cl. E01c 19/24
U.S. Cl. 94—50                                     5 Claims

ABSTRACT OF THE DISCLOSURE

A cantilever type support structure for supporting the frame of a roller vehicle on a roller wheel, including a vertical guide located at one side of the frame, a vertical column member movable with limited reciprocal movement within the guide, a horizontal shaft for carrying the roller rigidly connected to the vertical column member, and resilient support means connected between the column and shaft structure and the vertical guide.

BACKGROUND OF THE INVENTION

This invention is particularly useful in vibratory roller vehicles of the type used in the compaction of earth in the preparation of same for the paving of roads, streets, parking lots and the like. However, it is not limited to vibratory type vehicles and can be used in roller vehicles which do not include a vibrator.

It is important in vehicles of the vibratory type particularly to isolate and insulate vibrations of the roller as much as possible from the remainder of the vehicle and also from the operator. Such vibrations may be damaging to the other parts of the vehicle and unpleasant to the operator. Other constructions have been proposed in the past for achieving the same results but they are not suggestive of the rugged, reliable, effective and readily manufactured construction of the present invention.

SUMMARY OF THE INVENTION

In carrying out our invention in a preferred form thereof we provide a support structure for supporting the frame of a vehicle on a roller wheel which includes a vertically disposed guide connected to one side of the frame. A column member is arranged for limited vertical reciprocal motion in the guide, and a horizontal shaft is rigidly connected to the column member and extends transversely beneath the frame for carrying the roller wheel. The frame is supported on the roller wheel by means of resilient support means connected between the column and shaft structure and the guide.

BRIEF DESCRIPTION OF THE DRAWING

In the drawing,
FIG. 3 shows a partial side elevational view along the line 3—3 of FIG. 2,
FIG. 4 shows a view along the line 4—4 of FIG. 3,
FIG. 5 shows a view along the line 5—5 of FIG. 3,
and
FIG. 6 shows a partial transverse vertical sectional view along the line 6—6 of FIG. 1.

DESCRIPTION OF THE PREFERRED EMBODIMENT

Figure 1:
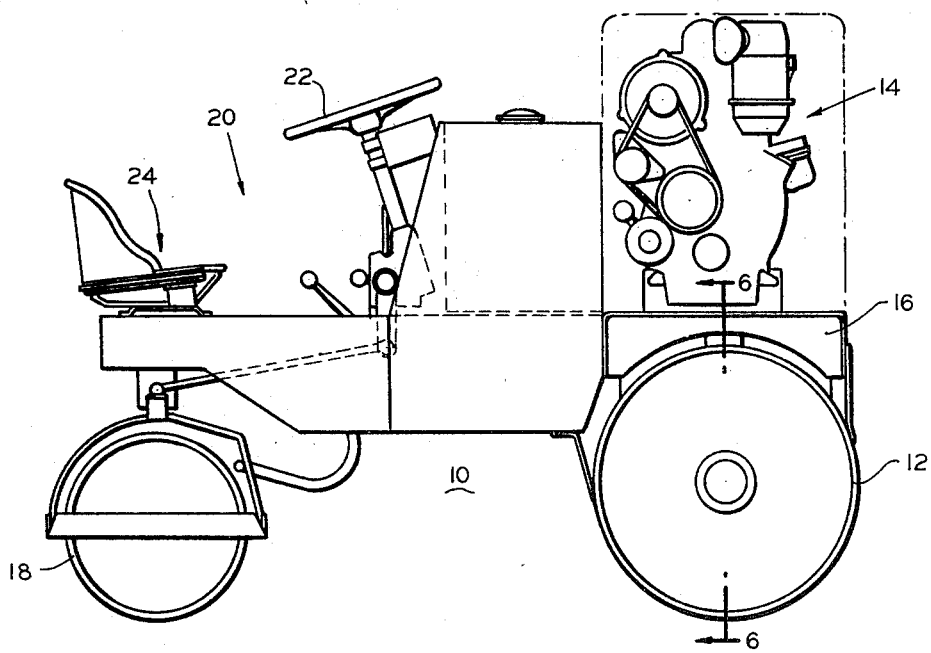
FIG. 1 shows a side elevational view of a roller vehicle embodying the present invention.

In the drawing, FIG. 1 shows a side elevational view of a roller vehicle adapted to compact earth and other material on construction projects to prepare for paving and the like, such vehicle being indicated generally by the numeral 10. Vehicle 10 is a relatively small rider type roller vehicle which includes a front roller 12 which is driven by an engine 14 mounted above the roller upon a frame 16, and roller 12 is a vibratory type roller as explained in greater detail hereinafter. The vehicle 10 also is equipped with a rear roller 18 which is not of the vibratory type in this case, and the roller 18 is steerable to provide for steering of the vehicle 10. The vehicle 10 is controlled from an operator's station 20 which includes a steering wheel 22, seat 24 and the various levers and other devices required for the operation of the vehicle.

Figure 2:
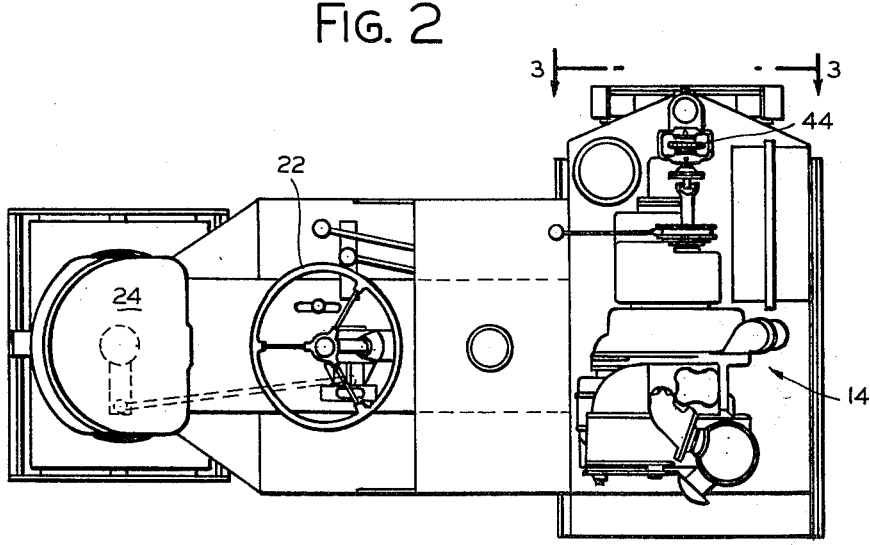
FIG. 2 shows a top plan view of the vehicle of FIG. 1.

The structure for supporting the frame 16 and other portions of the vehicle in cantilever fashion on the roller 12 is partially visible at the right top of FIG. 2, near the left edge of the vehicle as viewed from the operator's station. FIG. 3 shows a fractional view in elevation along the line 3—3 of FIG. 2 of a portion of such support structure.

In FIG. 3 there is shown a vertically disposed guide member 26 which in this case is a tubular member. This tubular member is rigidly secured to the frame 16 as indicated in FIG. 6. As may be seen in FIGS. 3 and 4 there are outwardly extending bracket members indicated by the numeral 28 which are rigidly secured to guide 26 as by welding. One bracket 28 extends forwardly parallel to the longitudinal axis of the vehicle 10 and the other rearwardly.

Referring to FIG. 6, there is a vertically disposed column member 30 located inside guide 26 which is provided with a suitable bushing 32 or other equivalent means to permit the column 30 to move reciprocally up and down in the guide 26. At the bottom of column 30 a transversely extending shaft 34 is rigidly secured to column 30. A roller 36 is arranged to rotate on shaft 34, being journaled thereon by suitable bearing structures indicated generally by the numerals 38 and 40. Roller 36 is driven in the preferred embodiment illustrated herein by means of a sprocket 42, secured to the drum 36, around which is trained a chain (not shown) which is driven by an upper sprocket 44 which appears in FIG. 2, sprocket 44 being driven by the engine 14.

Referring to FIGS. 3, 4 and 5, the structure by which the frame is supported on the roller can now be further explained. The transverse shaft 34 and column member 30 are rigidly connected to a U-shaped bracket 44 which extends forwardly and rearwardly so that the upper ends thereof confront the brackets 28. Secured between the respective brackets 28 and the respective upper ends of the bracket 44 are a pair of rubber blocks 46. This structure provides the sole support of the front of the frame 16 of the vehicle on roller 34, whereby a cantilever arrangement is provided. Because of the resiliency of the rubber blocks, springing action is provided whereby the shaft 34 can move upwardly and downwardly as the column 30 likewise moves upwardly and downwardly. In addition, the rubber blocks provide for dampening shocks and vibrations of the roller 36 and minimizing the transmission of such shocks and vibrations from the roller to the rest of the vehicle and to the operator. Also the rubber blocks absorb the moment of force on the column 30 arising from reversal of travel of the vehicle between forward and reverse.

It is known that vibrating a roller such as roller 36 as it rolls over the ground will increase the compaction which is achieved on each pass, and the present roller is equipped with a vibrated 48 which is suspended from the shaft 34. As shown, the vibrator 48 is operated by means of a hydraulic motor which is indicated at 50, although it will be appreciated that other arrangements for vibrating the roller are known and can be utilized if desired. It has been found that the use of the structure of this invention for supporting the frame on the roller materially suppresses the transmission of vibrations from the vibrator 48 up to frame 16 and other parts of the vehicle and to the vehicle operator.

While we have described and illustrated herein a preferred embodiment of our invention it will be understood that modifications may be made without departing from the spirit of our invention. For example, the invention is not limited to the use of rubber blocks 46, and if desired coil springs or other equivalent resilient means may be substituted for the rubber blocks. It should be understood therefore that we intend to cover by the appended claims all modifications falling within the true spirit and scope of our invention.

What we claim is:

1. A support structure for supporting the frame of a vehicle on a roller wheel comprising, a vertically disposed guide connected to one side of the frame, a column member arranged for limited vertical reciprocal motion in the said guide, a shaft rigidly connected to the said column member and extending transversely beneath the said frame for carrying the roller wheel, and resilient support means connected between the said column and shaft structure and the said guide, the said resilient support means comprising brackets extending forwardly and rearwardly from the said guide, an additional bracket extending forwardly and rearwardly from the said column and shaft structure, and a pair of resilient devices connected respectively between the said first mentioned brackets and the said additional bracket.

2. A structure as specified in claim 1 in which the said resilient devices are comprised principally of rubber.

3. A structure as specified in claim 1 in which a vibrator is mounted on the said transversely extending shaft.

4. A structure as specified in claim 1 in which an engine is carried on the said frame, a roller wheel is journaled on the said shaft, and vertically disposed drive means are provided adjacent the guide for operating the said roller from the said engine.

5. A structure as specified in claim 4 in which the said drive means includes a sprocket mounted on the roller, an upper sprocket and an endless chain trained over the said sprockets for operating the former from the latter.

References Cited

UNITED STATES PATENTS

| 2,671,386 | 3/1954 | Kerridge | 94—50 |
| 2,873,656 | 2/1959 | Andersson | 94—50 |
| 2,925,759 | 2/1960 | Hillis | 94—50 |
| 3,105,424 | 10/1963 | Dion | 94—50 |
| 3,225,669 | 12/1965 | Green | 94—50 |

FOREIGN PATENTS

| 230,760 | 3/1925 | Great Britain. |
| 934,932 | 8/1963 | Great Britain. |

JACOB L. NACKENOFF, Primary Examiner